(12) United States Patent
Seo et al.

(10) Patent No.: US 11,026,118 B2
(45) Date of Patent: Jun. 1, 2021

(54) CONGESTION CONTROL METHOD FOR CONTENTION-BASED TRANSMISSION IN WIRELESS COMMUNICATION SYSTEM AND APPARATUS THEREFOR

(71) Applicant: LG Electronics Inc., Seoul (KR)

(72) Inventors: Hanbyul Seo, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 16/478,589

(22) PCT Filed: Feb. 5, 2018

(86) PCT No.: PCT/KR2018/001492
§ 371 (c)(1),
(2) Date: Jul. 17, 2019

(87) PCT Pub. No.: WO2018/143739
PCT Pub. Date: Aug. 9, 2018

(65) Prior Publication Data
US 2020/0045578 A1    Feb. 6, 2020

Related U.S. Application Data

(60) Provisional application No. 62/454,099, filed on Feb. 3, 2017.

(51) Int. Cl.
*H04W 28/02* (2009.01)
*H04W 74/08* (2009.01)
*H04W 74/00* (2009.01)

(52) U.S. Cl.
CPC ... *H04W 28/0289* (2013.01); *H04W 28/0284* (2013.01); *H04W 74/006* (2013.01); *H04W 74/0833* (2013.01)

(58) Field of Classification Search
None
See application file for complete search history.

(56) References Cited

U.S. PATENT DOCUMENTS

2013/0010712 A1    1/2013   Kim et al.
2016/0345348 A1    11/2016  Chae et al.
(Continued)

FOREIGN PATENT DOCUMENTS

| KR | 1020100006484 A | 1/2010 |
| KR | 1020110066027 A | 6/2011 |
| KR | 101627465 B1 | 6/2016 |

OTHER PUBLICATIONS

NEC, "Discussions on congestion control in distributed scheduling mode", 3GPP TSG RAN WG1 Meeting #86bis, Oct. 10-14, 2016, R1-1609141.
(Continued)

*Primary Examiner* — Saba Tsegaye
(74) *Attorney, Agent, or Firm* — Dentons US LLP (57) ABSTRACT

Disclosed is a method for performing contention-based transmission by a user equipment in a wireless communication system. Specifically, the method comprises the steps of: calculating a channel congestion for contention-based transmission within a predetermined time window; and performing contention-based transmission to an eNode B, using an allocated resource on the basis of the calculated channel congestion, wherein: the channel congestion is a ratio of a size of resources used for contention-based transmission at a unit time point to a size of a resource pool for the contention-based transmission at the relevant unit time point, and is calculated at every unit time point within the time window; and the size of the resource pool is independently configured at every unit time point.

10 Claims, 10 Drawing Sheets

Compute channel congestion for contention-based transmission within prescribed time window (S1001)

Perform contention-based transmission to base station using resource allocated based on computed channel congestion (S1003)

(56) References Cited

U.S. PATENT DOCUMENTS

2017/0019894 A1    1/2017  Nimbalker et al.
2017/0181030 A1*   6/2017  Han .................... H04L 43/0882
2018/0152969 A1*   5/2018  Tao ......................... H04L 43/16

OTHER PUBLICATIONS

LG Electronics, "Discussion on UE behavior in congestion control", 3GPP TSG RAN WG1 Meeting #87, Nov. 14-18, 2016, R1-1611741.

\* cited by examiner

FIG. 1

E-UMTS

FIG. 2

(A) CONTROL-PLANE PROTOCOL STACK (B) USER-PLANE PROTOCOL STACK

CONGESTION CONTROL METHOD FOR CONTENTION-BASED TRANSMISSION IN WIRELESS COMMUNICATION SYSTEM AND APPARATUS THEREFOR

This application is a National Stage Entry of International Application No. PCT/KR2018/001492 filed Feb. 5, 2018, which claims priority to U.S. Provisional Application No. 62/454,099 filed Feb. 3, 2017, all of which are incorporated herein by reference.

TECHNICAL FIELD

The present disclosure relates to a wireless communication system, and more particularly, to a method of controlling congestion for contention-based transmission in a wireless communication system and apparatus therefor.

BACKGROUND ART

As an example of a mobile communication system to which the present disclosure is applicable, a 3rd Generation Partnership Project Long Term Evolution (hereinafter, referred to as LTE) communication system is described in brief.

Figure 1:
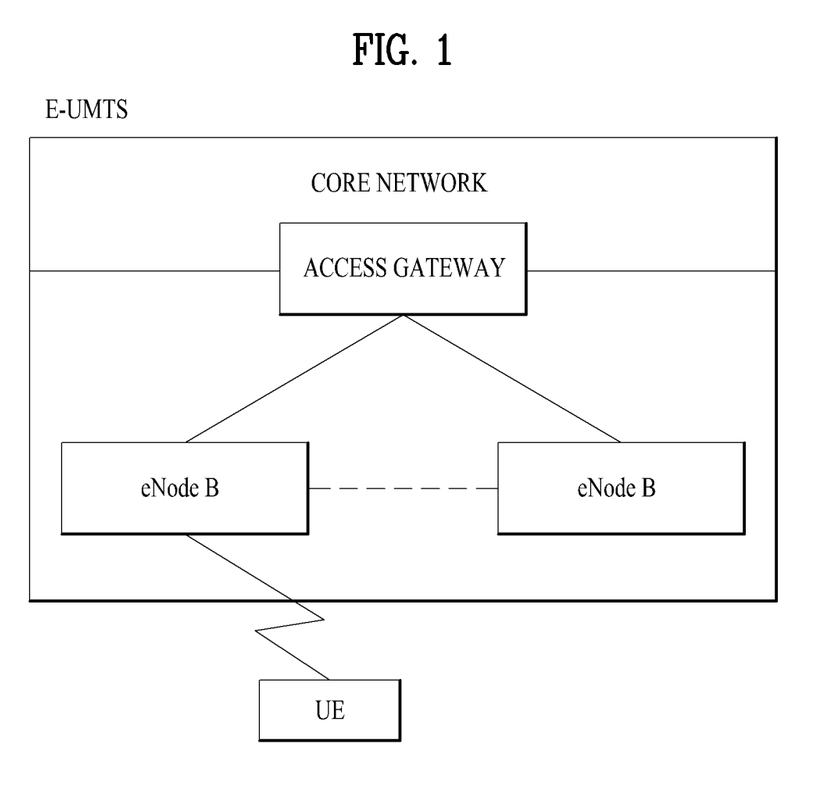
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF THE INVENTION

Technical Task

Based on the above discussion, it is intended to propose a method of controlling congestion for contention-based transmission in a wireless communication system and apparatus therefor as follows.

Technical Solutions

In one technical aspect of the present disclosure, provided herein is a method of performing contention-based transmission by a user equipment in a wireless communication system, the method including computing channel congestion for the contention-based transmission within a prescribed time window and performing contention-based transmission to a base station using a resource allocated based on the computed channel congestion, wherein the channel congestion is a rate of a size of a resource used for the contention-based transmission at a unit timing point over a size of a resource pool for the contention-based transmission at the corresponding unit timing point and is added up by being computed at each of the unit timing point within the window and wherein the size of the resource pool is independently set at each of the unit timing point.

In another technical aspect of the present disclosure, provided herein is a user equipment in a wireless communication system, the user equipment including a wireless communication module and a processor configured to compute channel congestion for contention-based transmission within a prescribed time window by being connected to the wireless communication module and perform the contention-based transmission to a base station using a resource allocated based on the computed channel congestion, wherein the channel congestion is a rate of a size of a resource used for the contention-based transmission at a unit timing point over a size of a resource pool for the contention-based transmission at the corresponding unit timing point and is added up by being computed at each of the unit timing point within the window and wherein the size of the resource pool is independently set at each of the unit timing point.

Preferably, a control signal including information on the resource pool for the contention-based transmission among whole resource pools is received at each of the unit timing point from the base station.

More preferably, if the reception of the control signal fails, the size of the resource pool for the contention-based transmission of the corresponding unit timing point is set to a size of a minimum resource pool for the contention-based transmission.

Additionally, the user equipment computes the size of the resource pool for the contention-based transmission at each of the corresponding unit timing point. In this case, if the computed channel congestion exceeds a threshold and a priority of the contention-based transmission is a top priority, the user equipment may perform the contention-based transmission to the base station using a reserved resource not included in the resource pool for the contention-based transmission.

Advantageous Effect

According to an embodiment of the present disclosure, more efficient congestion control can be performed for contention-based communication.

The effects that can be achieved through the embodiments of the present disclosure are not limited to what has been particularly described hereinabove and other effects which are not described herein can be derived by those skilled in the art from the following detailed description.

BEST MODE FOR INVENTION

Hereinafter, structures, operations, and other features of the present disclosure will be readily understood from the embodiments of the present disclosure, examples of which are illustrated in the accompanying drawings. Embodiments described later are examples in which technical features of the present disclosure are applied to a 3GPP system.

Although the embodiments of the present disclosure are described using a long term evolution (LTE) system and a LTE-advanced (LTE-A) system in the present specification, they are purely exemplary. Therefore, the embodiments of the present disclosure are applicable to any other communication system corresponding to the above definition. In addition, although the embodiments of the present disclosure are described based on a frequency division duplex (FDD) scheme in the present specification, the embodiments of the present disclosure may be easily modified and applied to a half-duplex FDD (H-FDD) scheme or a time division duplex (TDD) scheme.

Moreover, in the present specification, a name of a base station can be used as inclusive terms including Remote Radio Head (RRH), eNB, Transmission Point (TP), Reception Point (RP), relay, etc.

Figure 2:
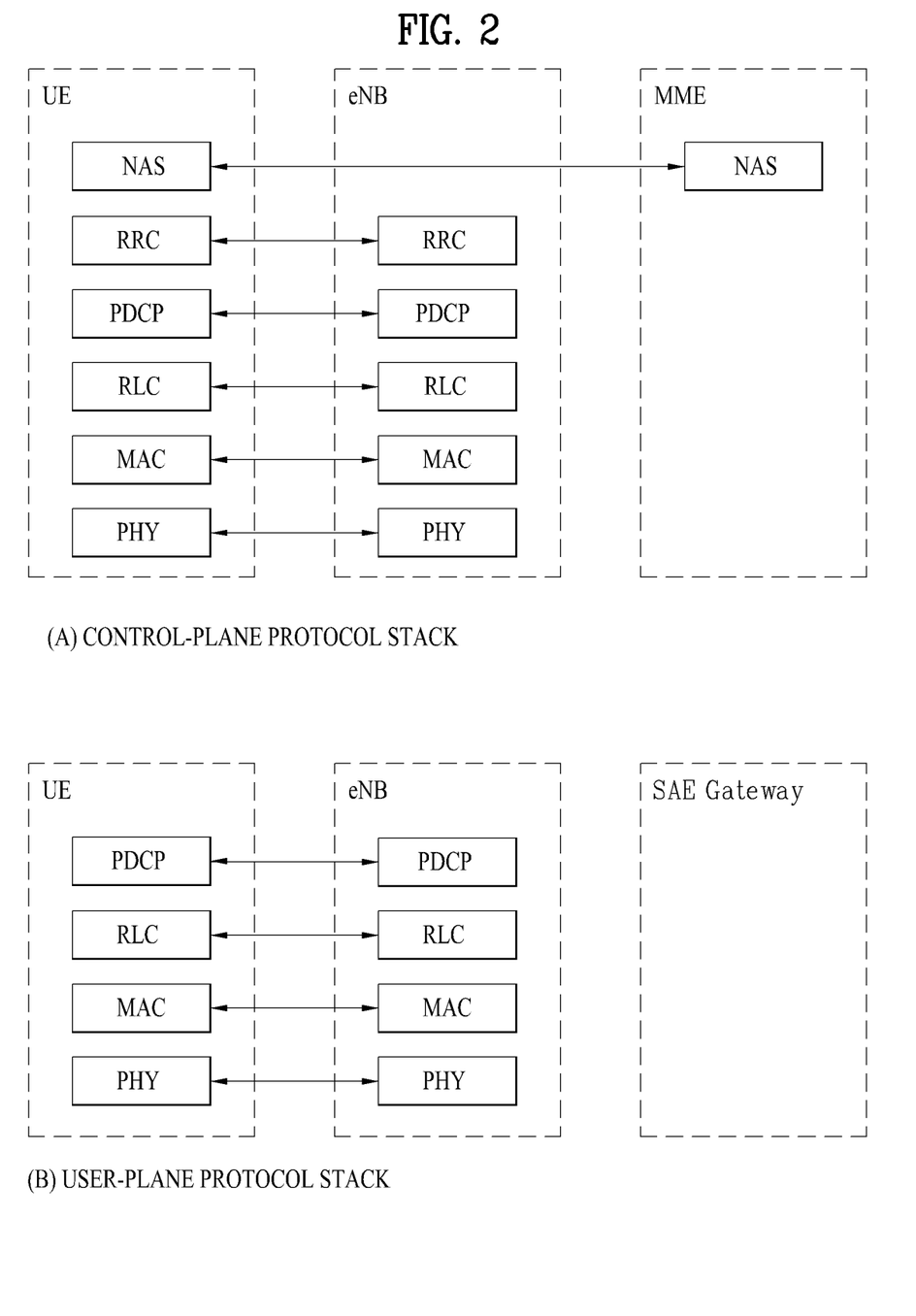
FIG. 2 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer, which is a first layer, provides an information transfer service to a higher layer using a physical channel. The PHY layer is connected to a Medium Access Control (MAC) layer located on a higher layer via a transport channel. Data is transported between the MAC layer and the PHY layer via the transport channel Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of the second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other. In case that 'RRC connected' exists between a RRC layer of a UE and a RRC layer of a network, the UE is in RRC connected mode. Otherwise, the UE is in idle mode. A Non-Access Stratum layer over the RRC layer performs functions such as session management, mobility management and the like.

One cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
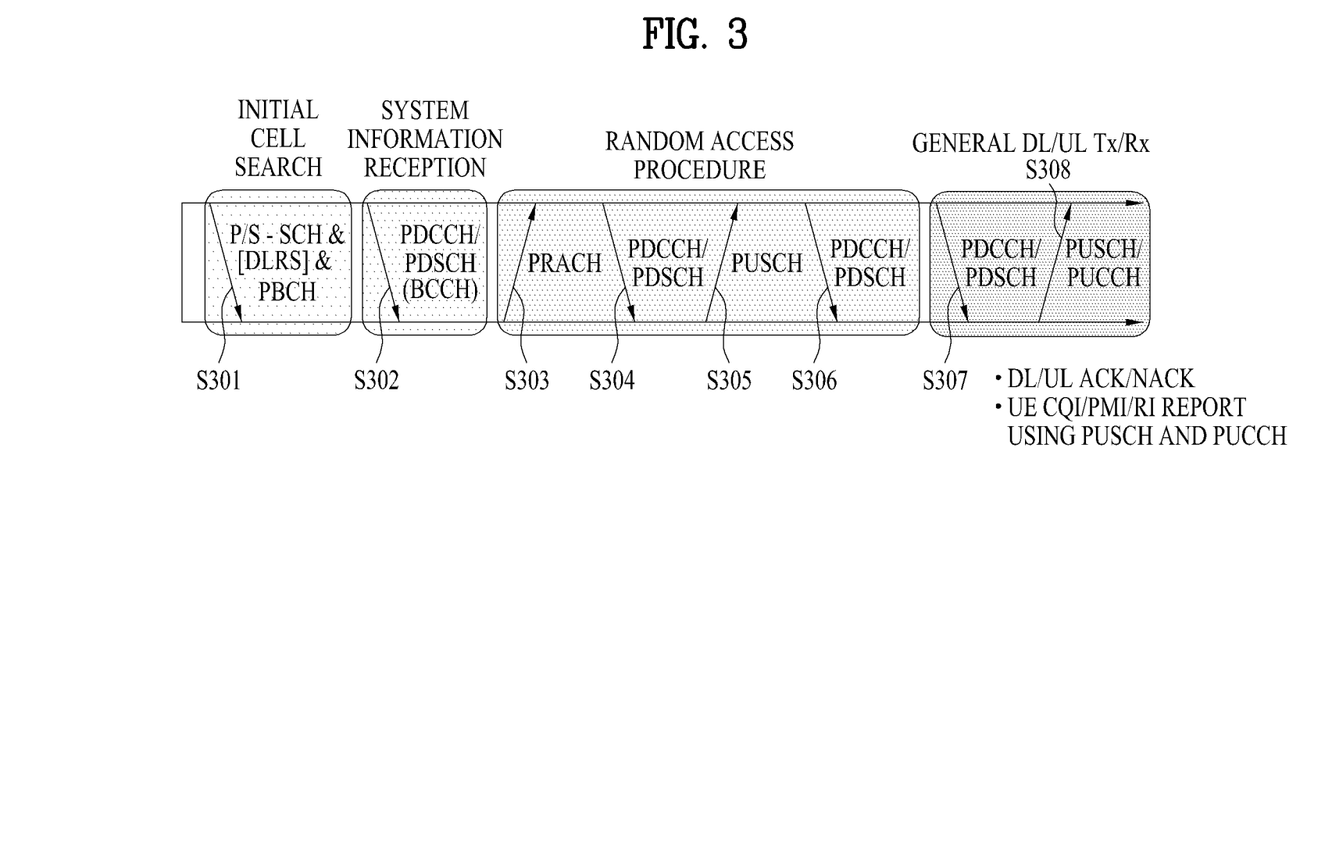
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303), and receive a response message to the preamble through the PDCCH and the PDSCH corresponding thereto (S304 and S306). In case of contention based RACH, a contention resolution procedure may be further performed.

The UE which has performed the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 4:
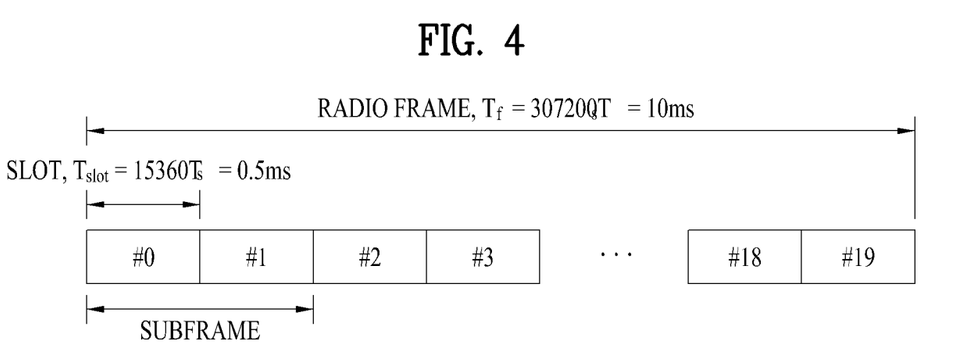
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)$ $=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
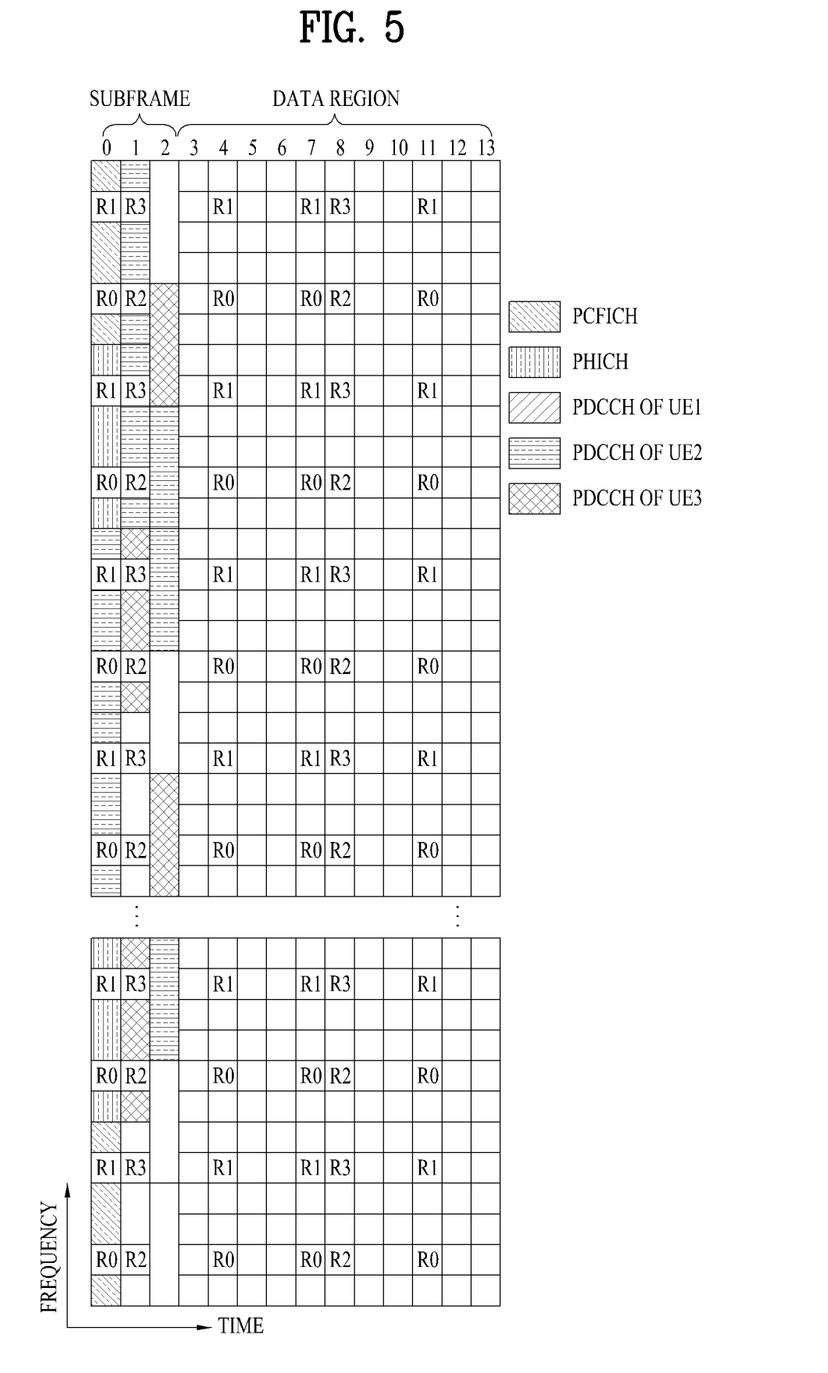
FIG. 5 is a diagram showing the structure of a downlink radio frame used in a Long Term Evolution (LTE) system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
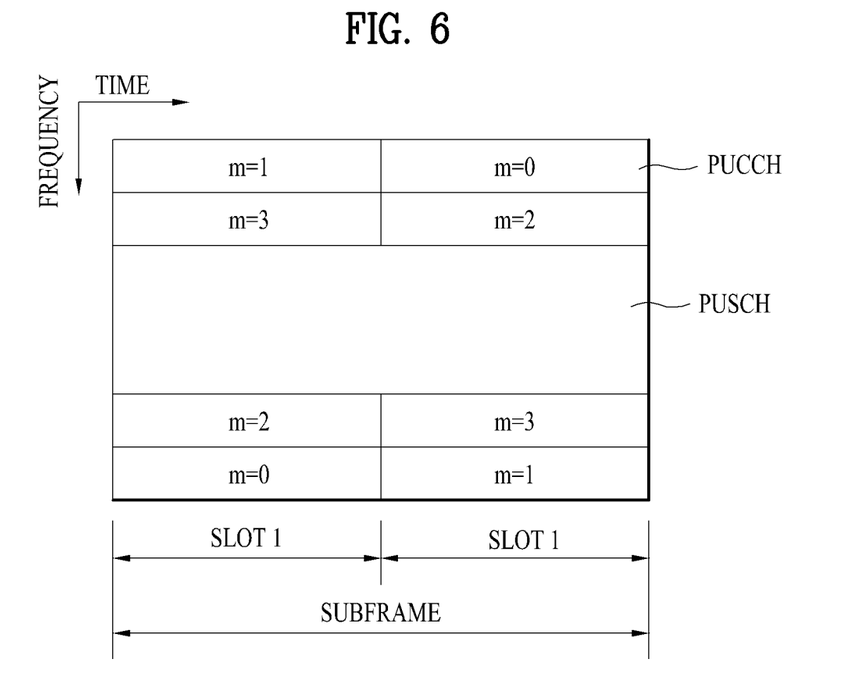
FIG. 6 is a diagram showing the structure of a uplink radio frame used in a Long Term Evolution (LTE) system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
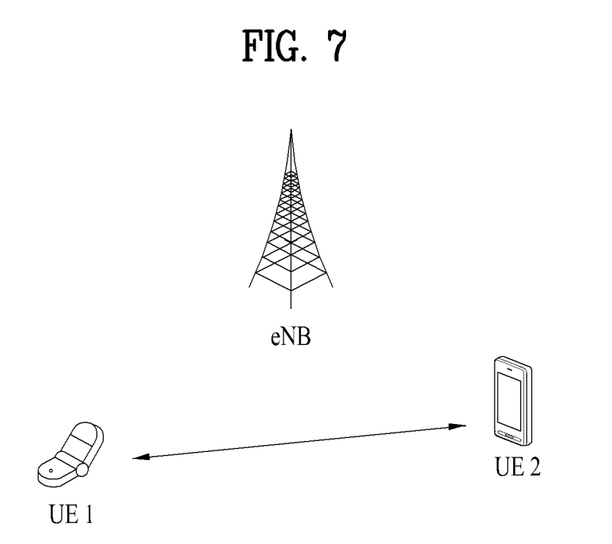
FIG. 7 is a conceptual diagram of UE-to-UE direct communication.

FIG. 7 is a conceptual diagram of UE-to-UE direct communication.

Referring to FIG. 7, in D2D (device-to-device) communication for a UE to perform wireless communication with another UE in direct, i.e., UE-to-UE direct communication, an eNB may send a scheduling message indicating D2D transmission/reception. A UE participating in D2D communication receives a D2D scheduling message from an eNB and performs a transmitting/receiving operation indicated by the D2D scheduling message. Here, although the UE means a user's terminal. In case that a network entity such as an eNB transmits/receives a signal according to a communication system between UEs, it may be regarded as a sort of UE as well. Moreover, an eNB can receive a D2D signal transmitted by a UE, and a UE's signal transmitting/receiving method designed for D2D transmission is applicable to an operation for a UE to transmit a UL signal to an eNB.

In the following, a link directly connected between UEs shall be named D2D link and a link for a UE to communicate with an eNB shall be named NU link. Or, a link directly connected between UEs may be named SideLink (SL) in conceptual comparison with UL And DL.

Described in the following is a case that UE1 selects a resource unit corresponding to a specific resource from a resource pool meaning a set of a series of resources and then transmits a sidelink signal using the corresponding resource unit. Here, a base station can inform the UE1 of the resource pool if the UE1 is located in the coverage of the base station. If the UE1 is located out of the coverage of the base station, another UE may inform the UE1 of the resource pool or the resource pool may be determined as a predetermined resource. Generally, a resource pool is configured with a plurality of resource units. And, each UE may select one or more resource units and use the selected resource unit(s) for its sidelink signal transmission.

Figure 8:
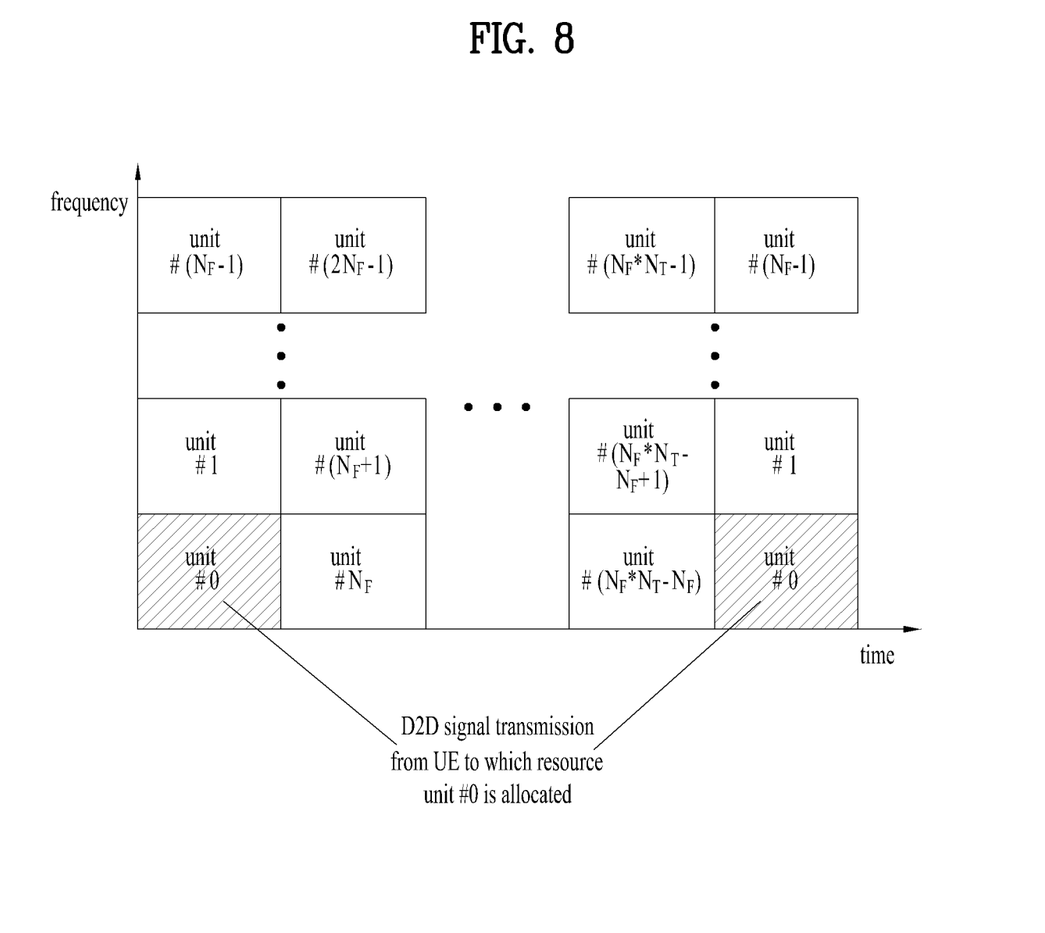
FIG. 8 shows a configuration example of a resource pool and resource units.

FIG. 8 shows a configuration example of a resource pool and resource units.

Referring to FIG. 8, a whole frequency resource is divided into $N_F$ and a whole time resource is divided into $N_T$, total $N_F*N_T$ resource units are defined for example. Particularly, a corresponding resource pool may be regarded as repeated by periods of $N_T$ subframes. Typically, a single resource unit may appear repeatedly and periodically. Or, in order to obtain a diversity effect in time or frequency dimension, an index of a physical resource unit having a single logical resource unit mapped thereto may vary in a predetermined pattern according to a time. In such a resource unit structure, a resource pool may mean a set of resource units that can be used for transmission by a UE intending to transmit a sidelink signal.

Described in the present disclosure is a method of controlling congestion appropriately when a UE transmits a signal through a contention-based transmission. Here, the contention-based transmission means a transmission performed in a manner that when a resource pool of a series of preset resources exists like the aforementioned sidelink signal transmission, a UE selects a prescribed portion of the resource pool as resources to use for its transmission.

In this case, a base station or a UE except a transmitting UE is not aware which resource will be actually used unless the transmitting UE sends corresponding information through a separate signaling. To prevent waste of resource, several UEs may apply contention-based transmission to a single resource pool. As a result, since two UEs perform transmissions on the same resource, they may cause interference to each other. To mitigate such interference, one UE may employ a sensing operation of selecting a transmission resource of its own by determining a presence or non-presence of transmission of the other UE.

Referring to FIG. 8, a UE may select one or more units for an actual transmission. In a special case, a resource pool may be configured with a single unit only, which may be interpreted as a UE uses a whole resource of a resource pool for a transmission. Through such an operation, the UE may perform a D2D transmission to a neighbor UE directly or a UL transmission to a base station. For example, in a situation that adjacent base stations share a predetermined resource pool, each base station may perform a DL transmission by selecting a suitable resource unit. Generally, contention based transmission has an effect of reducing a time delay taken to actually enter a transmission by reducing a series of scheduling processes for preventing collision between transmitting UEs and signaling for announcing such processes, thereby being usefully used for a transmission of a message that should be sent promptly.

In the aforementioned contention-based transmission, if one UE uses an excessive amount of resources for transmission, it may cause serious interference to transmission of another UE. Hence, although heavy traffic is generated temporarily, an operation of preventing interference between transmitted signals from increasing excessively by adjusting a level of a load put on a resource pool into a suitable level is required. This is defined as congestion control. For example, a UE may calculate an amount of a resource used for its transmission during a past predetermined time interval (e.g., within recent 1 second) and provide that the amount of the transmission resource becomes equal to or lower than a predetermined level. In this case, a rate of an amount of a resource used for transmission by the UE over an amount of a whole resource in a resource pool is defined as a Channel Resource (CR). If a new transmission occurs at each timing point, the CR is updated. And, the UE may operate in a manner that the updated CR becomes equal to or smaller than CR_limit that is an upper limit. Here, the CR_limit may be a value that is determined by a channel load observed by the UE. Particularly, such a value may be derived from a function having a property that the value decreases if a channel load increases. In case of following such congestion control, as a rate of resource available for a UE in case of a heavy load is lowered, it brings an effect that a load is reduced again.

Described in the following are methods for performing congestion control effectively in contention-based transmission. Particularly, the present disclosure is applicable to grant-free UL transmission performed on the basis of contention without a UL grant in New RAT (NR) that is the next generation communication scheme.

First Embodiment

Although data to be transmitted by a UE is generated during an operation of contention-based transmission, if CR reaches CR_limit at that timing, the UE may take an operation of dropping the corresponding data to maintain the CR equal to or smaller than CR_limit. Yet, such an operation is not suitable for data of a high priority that requires a high level of success probability. Of course, it may be possible for a transmission of low priority not to affect congestion control over a high priority transmission by separately defining CR or CR_limit per priority. Yet, in case that high priority data are still generated intensively in a specific situation, the same kind of problem may be caused. However, if congestion control is not applied to a high priority at all, it may happen that the high priority occupies the whole resource pool.

To solve this problem, when data of a high priority is generated, the present disclosure proposes to allow a transmission on a resource in a predetermined size when CR_limit is reached. As the predetermined resource is configured in a relatively small size, a minimum transmission of data of a high priority may be enabled in a situation that CR_limit is reached.

Figure 9:
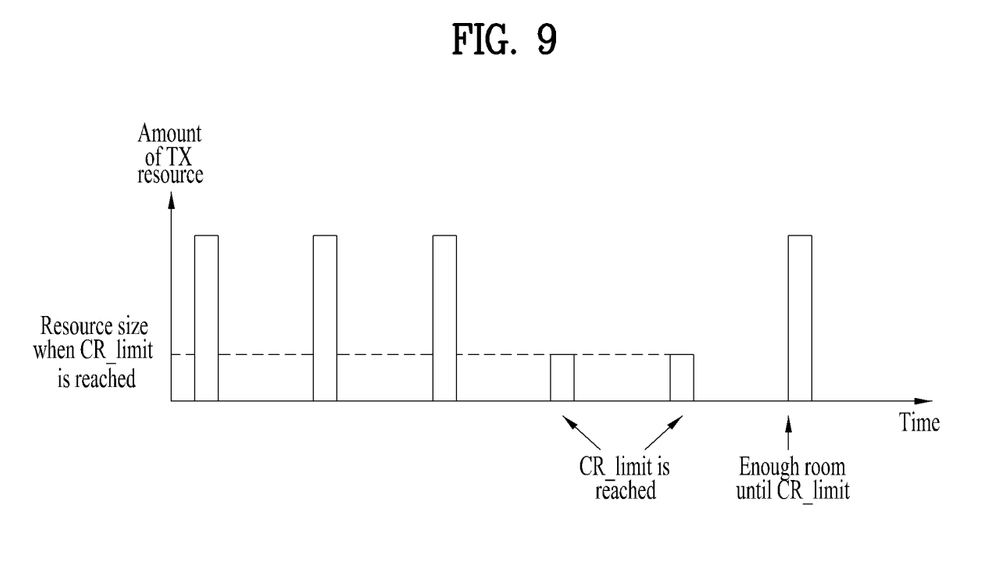
FIG. 9 shows an example of an operation of a UE if CR_limit is reached in a contention-based transmission.

FIG. 9 shows an example of an operation of a UE if CR_limit is reached in a contention-based transmission.

Referring to FIG. 9, for a fourth transmission and a fifth transmission, a resource in a predetermined size is used only according to CR_limit due to a past transmission. And, it is observed that a desired amount of resource is used for a sixth transmission owing to a margin to CR_limit.

Particularly, as it is provided that a resource used by such an operation is excluded from CR calculation, it may be able to prevent the occurrence of a situation that a minimum resource should be used serially. Or, in case of using a resource equal to or lower than a predetermined level, it may be provided as excluded from CR calculation. Namely, it may be provided that a resource use amounting to max {X-Y, 0} is reflected by CR calculation in a manner of setting a constant threshold Y if a size of a resource used by a UE at a specific timing is X. In this case, since a use of a resource in a size equal to or smaller than the threshold Y is not reflected by CR calculation, it can be used at any time.

Meanwhile, a DM-RS used by a UE can be distinguished on the same resource through a difference sequence. Particularly, when a DM-RS sequence is designated per individual UE in advance, if a channel situation is ideal and different DM-RS sequences are orthogonal to each other, a transmission of a DM-RS sequence only does not work as interference with a transmission of another UE. Therefore, if a UE transmits a DM-RS only in a contention-based transmission, it may operate as not included in CR calculation. Particularly, such an operation may be useful for a UL operation in which a DM-RS sequence is allocated to each UE in advance. If a specific UE reaches CR_limit but still has data to transmit, the UE transmits a DM-RS only within a contention-based transmission resource pool. Through this, a base station may determine that there is a resource the corresponding UE will transmit at least and perform an appropriate resource scheduling separately.

Second Embodiment

Having performed a contention-based transmission, a UE may also perform a retransmission of the corresponding data if necessary. Particularly, as closed-loop HARQ operates, if a message indicating that transmitted data was not correctly received is not received from a receiving end, a retransmission may be performed. Since such a retransmission works as interference with a transmission of another UE as well, it is a matter of course that such a transmission is included in CR calculation.

Exceptionally, if an instruction of a retransmission is received from a resource managing device, e.g., a base station performing configuration of a resource pool, it may operate as not included in CR calculation. This is because the resource managing device can give an instruction of such a retransmission by considering a congestion situation already. In case of a UL transmission, since a base station is a receiving end as well, the base station may obtain a success or failure of reception and a congestion situation and then designate a retransmission in direct. In case of a D2D transmission, a receiving UE may report a success or failure and/or a congestion situation to a base station. And, the base station may forward it to a transmitting UE and designate a retransmission in direct.

Or, if a congestion situation observed by a transmitting UE and a congestion situation observed by a receiving UE are different from each other in a D2D transmission, an exception may occur. After a transmitting UE has transmitted data, as CR_limit is reached, a retransmission is impossible. In such a situation, let's consider a case that a receiving UE fails in reception. In this case, as congestion is not high in aspect of the receiving UE, the receiving UE may determine that a retransmission of the transmitting UE does not cause a problem. Accordingly, the receiving UE informs the transmitting UE of such a situation. Having received such information, the transmitting UE may trust the information on the low congestion received from the receiving UE and allow the retransmission to be performed even in the CR_limit reached situation exceptionally.

By further generalizing the aforementioned operation, a weight on reflecting an amount of a resource used by first transmitted data in CR and a weight on reflecting an amount of a resource used for a retransmission in CR may be given differently. For example, an operation may be performed as follows. First of all, an amount of a used resource for an initial transmission is intactly included in CR calculation and an amount smaller than an actually used amount is included in CR calculation in a manner of giving a predetermined wto a resource used for a retransmission.

Third Embodiment

A size of a resource pool may vary dynamically depending on a situation. For one example, a base station may allocate some of resources secured by the base station to contention-based transmission and utilize the rest for non-contention-based transmission. For another example, a base station may indicate a portion excluded from a resource pool through DCI. Particularly, regarding a resource pool for sidelink communication, a resource indicated for UL or DL usage may be separately indicated.

In this case, as an amount of resource required for non-contention-based transmission varies, a size of a contention-based transmission resource pool may vary dynamically. In this case, a CR calculating reference is required.

As one method, a resource pool used in calculating CR may presume a previously signaled nominal size. In this case, a size change of a resource pool at each timing point does not affect CR calculation. If a resource pool is reduced, although each UE may substantially underestimate CR, a base station may make such a determination in view of overall load of contention-based transmission and the like.

As another method, a size of a resource pool used in calculating CR may be regarded as a size of a resource pool determined actually and dynamically. As the CR is defined as a rate of a resource utilized for transmission in the resource pool, if a size of a resource pool varies even in a situation that a single UE transmits several data using a resource in the same size, a value reflected in the CR varies according to a time.

Equation 1 in the following is an equation for deriving a CR if a resource pool does not vary. Equation 2 is an equation for deriving a CR if a size of a resource pool varies dynamically according to the present disclosure. Particularly, a CR calculated at a timing point t in Equation 1 or Equation 2 is assumed as calculated with transmission resources at M timing points in a time interval [t−M+1, t].

$$CR = \frac{1}{Y} \sum_{i=t-M+1}^{t} X(i) \qquad \text{[Equation 1]}$$

$$CR = \sum_{i=t-M+1}^{t} X(i)/Y(i) \qquad \text{[Equation 2]}$$

The following description shall be made on the basis of the equations. Although a size of a resource used at a timing point t by a UE is X(t) and a total size of a resource pool used at the timing point t is a constant Y according to a related art, the total size is Y(t) having a timing point t as a factor according to the present disclosure.

In this operation, the reason why Y(i) varies is not only because a size of a given resource pool varies but also because a UE changes a resource pool used by itself while moving or a size of a resource pool used at a different location is different. In this case, as CR is reset in a new resource pool by maintaining CR calculation in a situation of moving between resource pools differing from each other in size, it is allowed to use lots of resources suddenly. As a result, it is able to prevent a problem of causing excessive interference in a congestion situation.

In case that a resource pool size used for CR calculation is dynamically changed, a case of failing in reception of a dynamic signal indicating a resource pool size may occur. In this case, it is able to calculate CR on the assumption that a predetermined size is maintained. Typically, it may be provided that a resource pool in minimum size, which can be indicated through a corresponding dynamic signal, is assumed as configured. Thus, a UE is operated conservatively not to underestimate CR, thereby preventing congestion occurrence due to signaling error.

Figure 10:
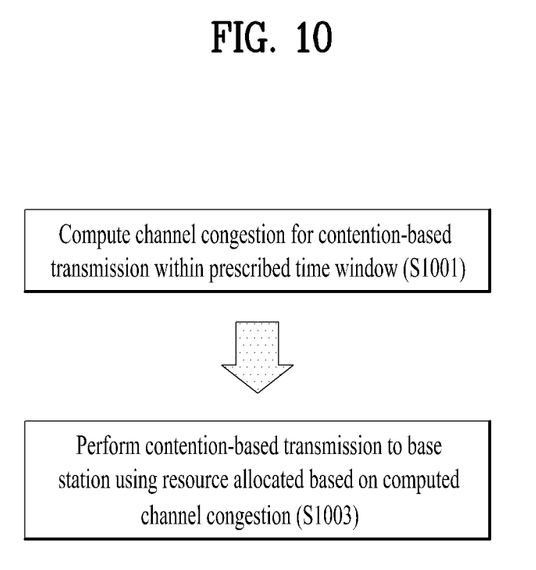
FIG. 10 shows an example of performing contention-based transmission by computing channel congestion according to an embodiment of the present disclosure.

FIG. 10 shows an example of performing contention-based transmission by computing channel congestion according to an embodiment of the present disclosure. Particularly, FIG. 10 shows an example of computing CR based on a size of a variable resource pool if a size of a resource pool varies dynamically depending on a situation.

Referring to FIG. 10, in a step 1001, a UE computes channel congestion (i.e., CR) for contention-based transmission within a prescribed time window. Particularly, the channel congestion is the rate of a size of resource used for contention-based transmission at a unit timing point over a size of a resource pool for the contention-based transmission at the corresponding unit timing point and is added up by being computed at each unit timing point within the window. And, the size of the resource pool is independently set at each unit timing point.

As one method for the UE to recognize the size of the resource pool, the UE may receive a control signal including information on the resource pool for the contention-based transmission among the whole resource pool at each unit timing point from the base station. Yet, in this case, if the UE fails in receiving the control signal, it is preferable that CR is computed by setting the size of the resource pool for the contention-based transmission at the corresponding unit timing point to a size of a minimum resource pool for the contention-based transmission.

As another method for the UE to recognize the size of the resource pool, the UE may directly compute the size of the resource pool for the As one method for the UE to recognize the size of the resource pool, the UE may at each corresponding unit timing point.

Subsequently, in a step 1003, the UE transmits a signal to the base station using a resource allocated based on the computed CR. Typically, if the computed CR exceeds a threshold and a priority of the signal is a top priority, the signal may be transmitted to the base station using a reserved resource not included in the resource pool for the contention-based transmission.

Although each of the first to third embodiments can be implemented independently, it is obvious that at least two of the first to third embodiments can be implemented by being combined together.

Figure 11:
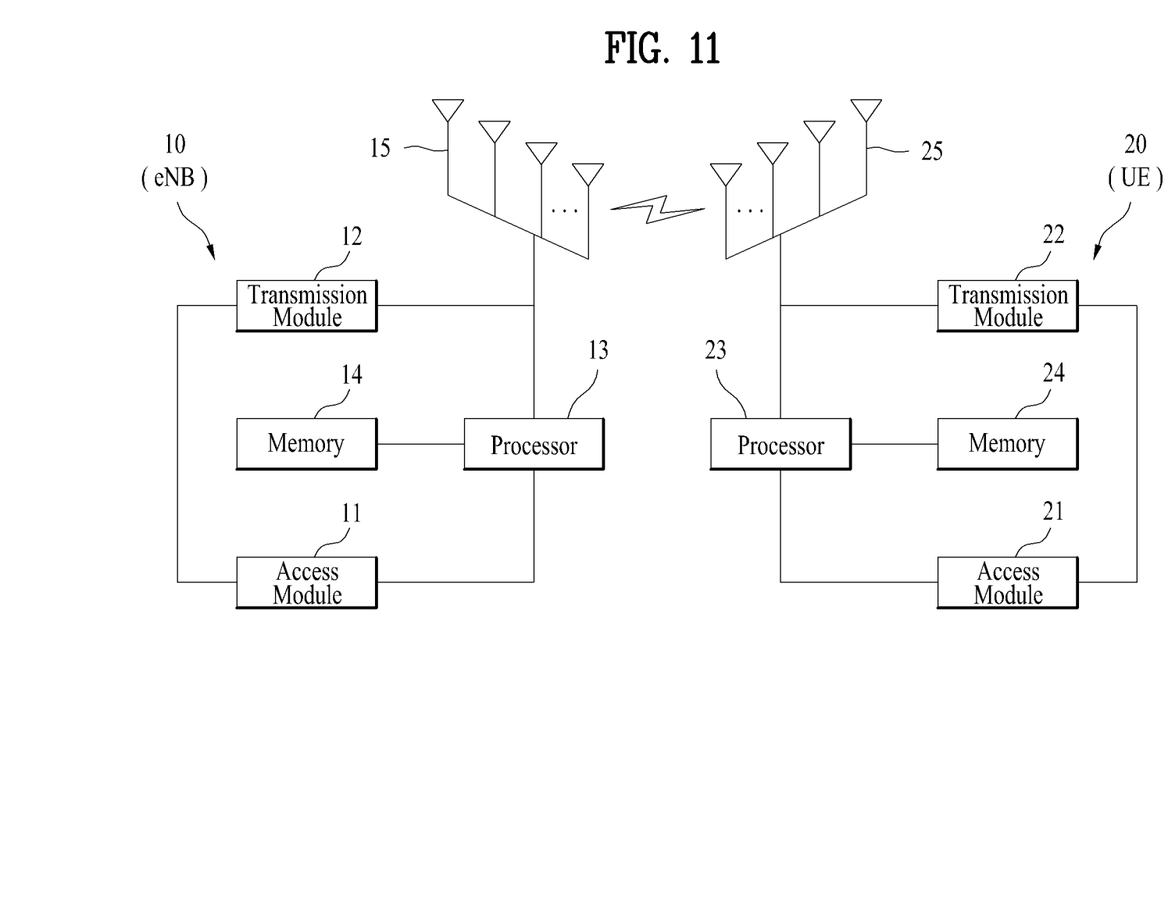
FIG. 11 is a diagram showing configurations of a base station and a user equipment applicable to an embodiment of the present disclosure.

FIG. 11 is a diagram showing configurations of a base station and a user equipment applicable to an embodiment of the present disclosure.

Referring to FIG. 11, a base station (eNB) 10 according to the present disclosure may include an Rx module 11, a Tx module 12, a processor 13, a memory 14 and a plurality of antennas 15. A plurality of the antennas 15 mean a base station supportive of MIMO transmission/reception. The Rx module 11 may receive various signals, data and information in uplink from a User Equipment (UE). The Tx module 12 may transmit various signals, data and information in downlink to the UE. The processor 13 may control overall operations of the base station 10. Particularly, the processor 13 of the base station 10 according to one embodiment of the present disclosure may process items necessary for the respective embodiments described with reference to FIGS. 1 to 10.

Besides, the processor 13 of the base station 10 may perform functions of processing operations of information received by the base station 10, information to be transmitted by the base station 10 and the like. And, the memory 14 can store the operation-processes information and the like for a prescribed time and may be substituted with components such as a buffer (not shown) and the like.

Referring still to FIG. 11, a User Equipment (UE) 20 according to the present disclosure may include an Rx module 21, a Tx module 22, a processor 23, a memory 24 and a plurality of antennas 25. A plurality of the antennas 15 mean a user equipment supportive of MIMO transmission/ reception. The Rx module 21 may receive various signals, data and information in downlink from the base station. The Tx module 22 may transmit various signals, data and information in uplink to the base station. The processor 23 may control overall operations of the UE 20.

Particularly, the processor 23 of the UE 20 according to one embodiment of the present disclosure may process items necessary for the respective embodiments described with reference to FIGS. 1 to 10.

Besides, the processor 23 of the UE 20 may perform functions of processing operations of information received by the UE 20, information to be transmitted by the UE 20 and the like. And, the memory 24 can store the operation-processes information and the like for a prescribed time and may be substituted with components such as a buffer (not shown) and the like.

The above-described embodiments are combinations of elements and features of the present disclosure in a predetermined manner Each of the elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present disclosure can be implemented by various means, for example, hardware, firmware, software, or combinations thereof. In the case of a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present disclosure may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of controlling congestion for contention-based transmission in a wireless communication system and apparatus therefor are described centering on an example applied to the 3GPP LTE system, it is also applicable to various wireless communication systems other than the 3GPP LTE system.

What is claimed is:

1. A method of performing contention-based transmission by a user equipment in a wireless communication system, the method comprising:
    computing channel congestion for the contention-based transmission within a prescribed time window; and
    performing contention-based transmission to a base station using a resource allocated based on the computed channel congestion,
    wherein the channel congestion is a rate of a size of a resource used for the contention-based transmission at a unit timing point over a size of a resource pool for the contention-based transmission at the corresponding unit timing point and is added up by being computed at each of the unit timing point within the window; and
    wherein the size of the resource pool is independently set at each of the unit timing point.

2. The method of claim 1, further comprising receiving a control signal including information on the resource pool for the contention-based transmission among whole resource pools at each of the unit timing point from the base station.

3. The method of claim 2, wherein if the reception of the control signal fails, the size of the resource pool for the contention-based transmission of the corresponding unit timing point is set to a size of a minimum resource pool for the contention-based transmission.

4. The method of claim 1, wherein the computing the channel congestion comprises computing the size of the resource pool for the contention-based transmission at each of the corresponding unit timing point.

5. The method of claim 1, wherein the performing the contention-based transmission to the base station comprises, if the computed channel congestion exceeds a threshold and a priority of the contention-based transmission is a top priority, performing the contention-based transmission to the base station using a reserved resource not included in the resource pool for the contention-based transmission.

6. A user equipment in a wireless communication system, the user equipment comprising:
    a wireless communication module; and
    a processor configured to compute channel congestion for contention-based transmission within a prescribed time window by being connected to the wireless communication module and perform the contention-based transmission to a base station using a resource allocated based on the computed channel congestion,
    wherein the channel congestion is a rate of a size of a resource used for the contention-based transmission at a unit timing point over a size of a resource pool for the contention-based transmission at the corresponding unit timing point and is added up by being computed at each of the unit timing point within the window; and
    wherein the size of the resource pool is independently set at each of the unit timing point.

7. The user equipment of claim 6, wherein the processor receives a control signal including information on the resource pool for the contention-based transmission among whole resource pools at each of the unit timing point from the base station.

8. The user equipment of claim 7, wherein if the reception of the control signal fails, the size of the resource pool for the contention-based transmission of the corresponding unit timing point is set to a size of a minimum resource pool for the contention-based transmission.

9. The user equipment of claim 6, wherein the processor computes the size of the resource pool for the contention-based transmission at each of the corresponding unit timing point.

10. The user equipment of claim 6, wherein if the computed channel congestion exceeds a threshold and a priority of the contention-based transmission is a top priority, the processor performs the contention-based transmission to the base station using a reserved resource not included in the resource pool for the contention-based transmission.

\* \* \* \* \*